Jan. 15, 1929.

C. H. DUTCHER 1,699,464

RETURN TRAP

Filed July 17, 1926    2 Sheets-Sheet 1

WITNESSES
H. J. Walker
Hugh H. Ott

INVENTOR
C. H. Dutcher
BY
ATTORNEYS

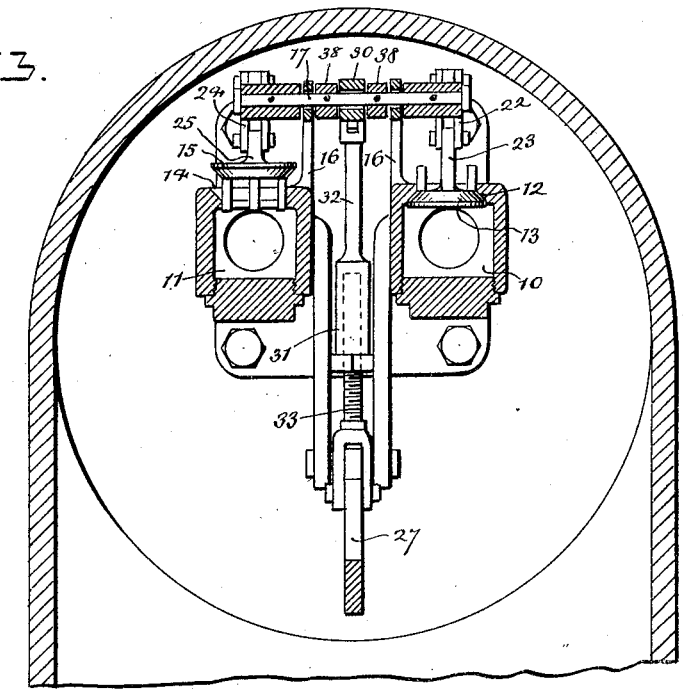

Patented Jan. 15, 1929.

1,699,464

UNITED STATES PATENT OFFICE.

CHARLES H. DUTCHER, OF JERSEY CITY, NEW JERSEY, ASSIGNOR TO KIELEY & MUELLER, INC., OF NEW YORK, N. Y., A CORPORATION OF NEW YORK.

RETURN TRAP.

Application filed July 17, 1926. Serial No. 123,242.

This invention relates to return traps adapted to be installed in steam systems for receiving and returning the water of condensation to the boiler and for simultaneously eliminating air from the system.

One of the principal objects of the present invention is to provide an improved return trap in which the valves and all working parts of the device are housed within the trap body so as to conceal and protect the same and dispose the valve elements at a point where they are subjected to a balanced condition.

The invention furthermore comprehends a trap including steam supply and vent valves having oppositely seating valve elements whereby the valve element controlling the entrance of steam to the trap is maintained in closed condition by the steam pressure and when steam pressure is in the trap equalization on opposite sides of the valve element minimizes the tension necessary to open the same, while the steam pressure when admitted to the trap operates as an auxiliary means for closing the valve element of the vent valve.

The invention furthermore comprehends a condensation return trap for steam heating systems in which the water of condensation is returned by gravity thereby greatly increasing circulation.

As a still further object the invention contemplates a condensation water return for steam heating systems including vent and steam inlet valves simultaneously actuated by a float-controlled means which rises and falls a given distance before operation of the valves is effected by a past-center spring-operated toggle.

The invention further aims to provide a condensation water return for steam heating systems which is comparatively simple in its construction and mode of operation, which is highly efficient in its purpose and which is economical to produce and install.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications may be resorted to when found expedient.

In the drawings—

Fig. 3 is an enlarged fragmentary vertical sectional view taken approximately on the line 3—3 of Fig. 1;

Fig. 4 is a diagrammatic view illustrating the manner in which the trap is installed.

Figure 1:
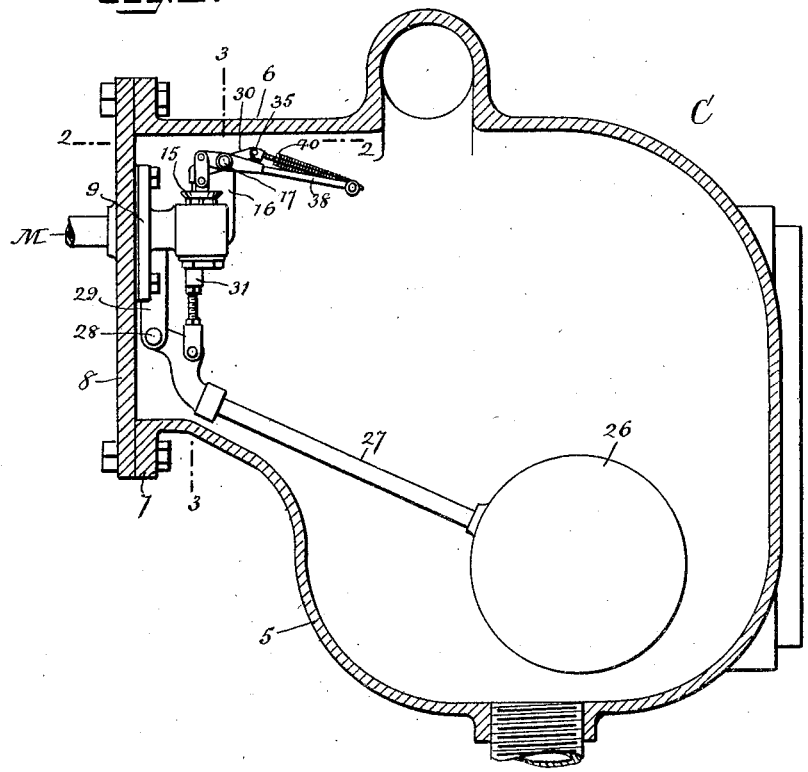
Figure 1 is a vertical sectional view through the trap body.
Figure 2:
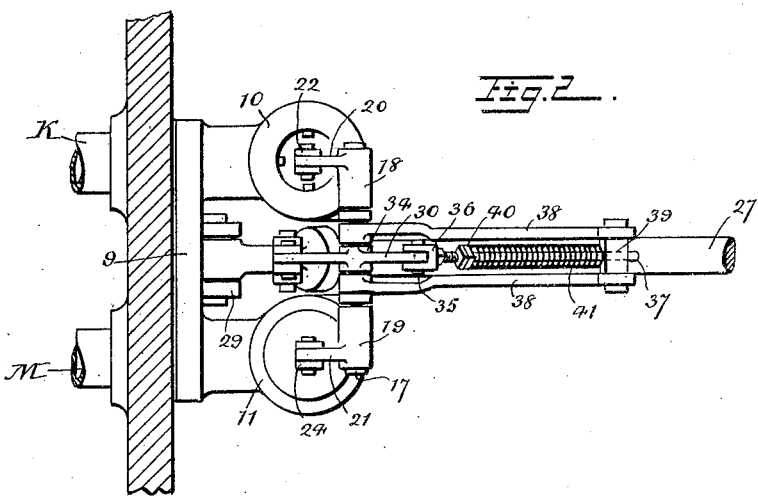
Fig. 2 is an enlarged fragmentary horizontal sectional view taken approximately on the line 2—2 of Fig. 1.

Referring to the drawings by characters of reference, and more particularly to Fig. 4, A designates the boiler from which the steam supply line B leads. The return trap designated generally by the reference character C, is provided with an outlet pipe D communicating with the lower end and connected by a pipe E with the water chamber of the boiler, the pipe E having a check valve F and a cut-off valve G. At its upper end the trap C has connected and communicating therewith, a return pipe H provided with a check valve I and a cut-off valve J. The trap C includes a body 5 formed with a laterally projecting neck 6 at its upper end, the outer end of which neck is open and formed with a flange 7. A closure plate 8 is bolted or otherwise secured to the flange for covering the neck. The cover plate also constitutes a support for a valve casting 9 which includes a steam inlet valve 10 and a vent or exhaust valve 11, the former valve 10 communicating through a feed pipe K with the supply line B, the pipe K having a cut-off valve L. The latter valve 11 communicates with a vent or discharge conduit M which communicates with the atmosphere. The valve 10 is provided with an internal valve seat 12 with which a valve element or disk 13 seats upon upward movement. The valve 11 is provided with an external valve seat 14 with which a valve element or disk 15 seats upon downward movement. The valve casting further comprises a pair of bearing arms 16 in which a shaft 17 is mounted for rotation. The shaft 17 has keyed thereto adjacent its opposite ends, sleeves 18 and 19 provided, respectively, with radially disposed arms 20 and 21, the former connected by a link 22 with the stem 23 of the valve 13 and the latter connected by a link 24 with the stem 25 of the valve 15 so that rotatory movement of the shaft 17 in opposite directions, simultaneously effects the closing or seating of one valve and the unseating of the other valve.

In order to provide means for effecting rotatory movements of the shaft 17, a float 26 having an arm 27 is fulcrumed at 28 to a depending bearing lug 29 on the valve casting 9. The float arm 27 is connected to a rock lever 30 by an adjustable connecting rod 31 which includes telescopically adjustable sections 32 and 33. The rock lever 30 is provided with a medial hub 34 mounted or fulcrumed on the shaft 17 and has its free outer end pivotally connected at 35 to the bifurcated end 36 of a stem 37. A yoke or toggle including spaced parallel arms 38 and a bight or cross connecting element 39, is keyed or connected at the free end of the arms to the shaft 17. The bight or cross connecting element 39 is apertured to slidably receive the free end of the stem 37 and the stem 37 is formed adjacent its bifurcated inner end with an adjustable spring seat or abutment 40. A coiled expansion spring 41 is interposed between the adjustable seat or abutment 40 and the bight or cross connecting element 39, and surrounds the stem 37.

In use and operation, the trap is installed approximately twenty-four inches higher than the water line of the boiler and the water of condensation from the system flows through the return pipe H to the trap body. At this time the float controlling the valve assemblage is in a position to dispose the valve element 13 closed and the valve element 15 opened so that pressure from the feed pipe B is cut off from the interior of the trap body while the vent M is open to the atmosphere. As the water of condensation reaches a predetermined level, the float 26 elevated thereby effects upward movement of the inner end of the rock lever 30 due to its connection therewith and lowers the outer end of the rock lever so that the spring 41 operates to shift the outer end of the yoke upwardly, reversing the position of the valve elements 13 and 15 simultaneously. This closes the vent 15 and establishes communication between the steam supply line B and the interior of the trap body through the vent pipe K. The pressure within the trap is thus raised to boiler pressure so that the water of condensation flows by gravity through the outlet pipe D, check valve F and return pipe E to the boiler. As the level of condensation reaches a predetermined point, the float 26 falling therewith, reverses the operation of the valve elements 13 and 15 until a new supply of condensation fills the trap to a predetermined high level. Under this arrangement, it is obvious that no water of condensation passes through the valves whatsoever while the valve assemblage operates merely to vent the trap to allow the free entrance of water of condensation and the escape of air from the system, while permitting boiler steam pressure to enter the trap for equalizing the pressure and allowing gravitation of the condensation collected in the trap back, to the boiler.

It will be further noted that the steam pressure is at all times, when the steam inlet valve is closed, on that side of the valve for forcing and maintaining the same in closed condition, thereby preventing entrance of steam to the trap except upon proper operation of the valve. Furthermore, by having both valve elements operate simultaneously, a balanced condition is set up which eliminates the necessity of the use of heavy springs or toggles. It will be further noted that the float, due to the toggle arrangement, rises and falls a given distance before the valve are operated.

The trap as set forth is especially designed for low-pressure systems such as vapor systems, which work on a pressure from one-quarter to one pound but may be used up to a fifteen-pound pressure.

I claim—

1. In a condensation trap of the class described, pressure intake and vent valves and a valve controlling mechanism comprising a rock shaft operatively connected with the valves, a lever mounted on and turnable with respect to the shaft, a float connected to one end of the lever, a yoke connected to said rock shaft, a stem pivotally connected to the remaining end of the lever and slidably associated with the free end of the yoke and a coiled expansion spring surrounding the stem for exerting a pressure on the free end of the yoke to effect swinging movements of the same when the lever is rocked in opposite directions by the float whereby to alternately effect the simultaneous opening of one valve and the closing of the other.

2. In a condensation trap including a trap body having a condensation inlet and outlet and a steam intake and vent, and a valved steam inlet and valved vent, mechanism for effecting the simultaneous opening of one valve and closing of the other comprising a rock shaft operatively connected with the valves, a lever mounted on and rockable with respect to the shaft, a float connected to one end of the lever, a yoke secured to the rock shaft, a stem pivotally connected to the remaining end of the lever and having sliding connection with the free end of the yoke and means for exerting a pressure on the free end of the yoke to effect swinging movement of the same when the lever is rocked in opposite directions.

CHARLES H. DUTCHER.